United States Patent Office 2,776,634
Patented Jan. 8, 1957

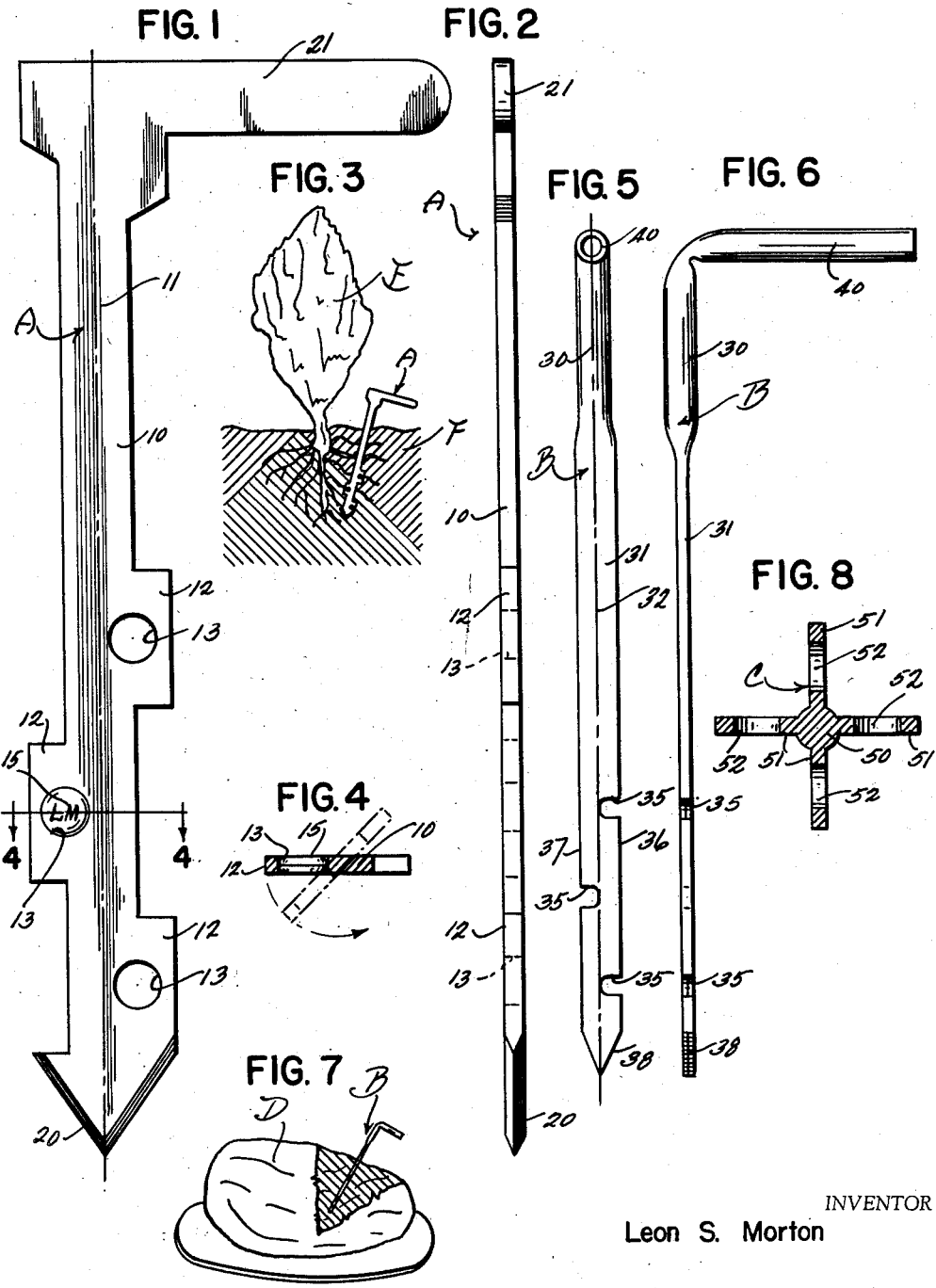

2,776,634

APPLICATOR FOR FEEDING SUBSTANCES INTO READILY PENETRABLE MATERIALS, SUCH AS EARTH AND FOOD PRODUCTS

Leon S. Morton, Oklahoma City, Okla.

Application March 10, 1955, Serial No. 493,387

6 Claims. (Cl. 111—92)

This invention relates to an appliance or applicator for feeding various substances into readily penetrable materials, either solids, powders, or in granulated or paste form, and possibly also into heavy viscid liquids, for the deposit of substances therein. The applicator can be used for the deposit of medicine or fertilizer in the earth, adjacent to the root system of trees, shrubs, bushes, flower plants, etc., or into such food products as meat, fowl, fish and vegetables, for the coloring, seasoning or other treatment thereof.

The primary object of this invention is the provision of a simple applicator for the depositing of treating substances into various materials, such as will insure the correct locational placement of the same within the material, wherein they will remain incidental to a turning action of the appliance and withdrawal thereof.

A further object of this invention is the provision of an improved applicator for the deposit of treating substances into various materials, such as the earth and food stuffs, of such nature that merely by the insertion of the same into the material and a slight turning action thereof the substances will be located and maintained in the correct and desired position within the material.

A further object of this invention is the provision of an improved applicator adapted to be used for insertion into such materials as earth and food stuffs, and having an improved means formed thereon for supporting pellets, tablets, capsules and the like, which will insure their deposit in a proper location within the earth or food stuff.

Other objects and advantages of this invention will be apparent during the course of the following detailed description.

In the accompanying drawings, forming a part of this specification, and wherein similar reference characters designate corresponding parts throughout the several views:

Figure 1 is a side elevation of one form of applicator, adapted to support tablets, pellets, capsules and the like with assurance that they will be correctly inserted and deposited into the material in which it is desired to use the applicator.

Figure 2 is an edge elevation of the applicator of Figure 1.

Figure 3 is a diagrammatic view, showing the root system of a shrub, bush or tree and the use of the applicator in the soil covering the root system for depositing fertilizer or other materials at the root system.

Figure 4 is a cross sectional view taken substantially on the line 4—4 of Figure 1.

Figure 5 is a side elevation of another form of applicator.

Figure 6 is an edge elevation of the applicator of Figure 5.

Figure 7 is a view showing the use of the applicator of Figure 6 in food.

Figure 8 is a transverse cross sectional view through a further modified form of applicator.

In the drawing, wherein for the purpose of illustration is shown several embodiments of the invention, the letters A, B, and C may designate three types of applicators, shown in Figures 1, 5 and 8 respectively, all of which are provided with means for supporting a substance to be deposited, which will insure such deposit merely upon the insertion and a slight turning movement of the applicator body in the material. I am well aware that heretofore it has been proposed to use various spikes, needles and utensils for depositing fertilizing materials and flavoring in the root system of plants and food stuffs, but for the most part they depend upon the application of internal pressure to laterally eject the substances to be deposited. These prior devices upon mere turning movement, after injection into the material, fail to release the substances to be deposited.

The material of which the present applicator is made can vary according to the use, and the resistance offered to insertion and turning. For the most part it may consist of aluminium or magnesium alloy or other solid, hollow or flat materials.

Referring to the form of invention A shown in Figures 1, 2 and 3, the same preferably is formed of some light weight solid material, such as aluminium or magnesium alloy. It comprises an elongated flat body 10. In cross section it is appreciably greater in width than in thickness, as will be noted from Figures 1, 2 and 4. The center line 11 of this body portion 10 has been shown in Figure 1 and it will be noted that from the center line 11 the body portion forms wings or laterally extending flanges. The center line 11 is substantially the turning axis of the applicator. In order not to unduly widen the body portion 10, lateral extensions 12 may be provided along each edge thereof, as shown in Figure 1, wherein the recesses or openings are provided for receiving the substances to be deposited in the earth or food. The wings or extensions 12 are provided with transverse, preferably circular openings 13 therein, which are adapted to frictionally receive solid tablets or pellets 15, or capsules, or other materials which may be in paste or in other form with sufficient consistency to prevent the same from dropping from the openings 13. Inasmuch as the body portion 10 must be forced into the soil or food, the lower end thereof is preferably pointed and chisel edged, as shown at 20 across the entire width of the body from one extension edge thereof to the other, in order to facilitate forming an opening or passageway into the earth or food in which the substance is to be deposited.

Handle means is provided at the upper end of the body portion 10, to facilitate turning action thereof. It is thought that one crank arm 21 will be sufficient, as shown in the forms A and B of the invention, although a T-shaped handle may be provided if so desired.

In use of the applicator A, the passageways or openings 13 are loaded with the substance to be deposited, such as is shown at 15. The turning action is represented by the dot and dash lines and arrow in Figure 4. By turning the body portion 10 to the extent desired, the pellet or tablet 15 will remain in its original position and the applicator may then be withdrawn without disturbing the position of the pellet or tablet. This is also true in event a capsule or substance other than a tablet or pellet is used.

Referring to the form of invention B, the same is preferably formed of tubular stock material including a body portion 30, the lower portion 31 of which is flattened. This flattened portion 31, including the upper rounded portion, is intended to have a turning axis on the center line 32 and it will be noted that the material inserting portion 31 has the same characteristics as the body portion 10 of the form of invention A, in that at each side of the center line 32 is provided wing portions which are wider than the thickness thereof. In these so called wing portions are formed recesses 35, inwardly from the opposite and outer side edges 36 and 37, through the entire thickness of the portion 31. The substances to be inserted and deposited into the earth and food stuffs are frictionally retained in these recesses 35. The lower end of the inserting portion 31 is tapered to a point (see 38) to facilitate insertion of the applicator. The upper tubular end of the applicator is bent to form a crank arm 40, as handle means to facilitate the turning action.

The applicator B is used in the same manner as above described for the applicator A. Since the recesses 35, for the main part, are laterally beyond the axis 32, the substances will be pushed out of the recesses upon turning of the inserting portion 31. The applicator may be withdrawn from the material in which inserted without disturbing the fixed position of the fertilizing, or seasoning or other deposited substance. The use of the applicator B is illustrated in the piece of food D shown in Figure 7, and in Figure 3 the applicator A is shown as inserted in the root system of a tree or shrub E within the soil F.

It is within contemplation of my invention to provide other forms of the invention, for depositing substances in material such as the earth and food stuffs. Another such instance is shown in the cross sectional view of Figure 8 of a modified form of invention C wherein the longitudinal body portion is represented at 50; the same having wings 51, of any desired number laterally extending from the body portion 50. These wings 51 have substance receiving recesses or openings 52 therein. In this form of invention the applicator may have the openings 52 staggered along the wings or all located in the same vicinity, in event it is desired to deposit usual amounts of the substance in the material.

Various changes in the shape, size and arrangement of parts may be made to the form of invention herein shown and described, without departing from the spirit of the invention or scope of the claims.

I claim:

1. In an applicator for the feeding of materials into readily penetrable materials, such as earth, food products and the like, the combination of an elongated inserting body portion having a transverse cross section in which the width is appreciably greater than the thickness thereof, said body portion having material receiving recesses entirely through the thickness thereof laterally of the lengthwise center line of said body portion, and an active ingredient disposed in each of said recesses.

2. An applicator as defined in claim 1 in which the lower end of the body portion is provided with an inserting point and the upper end of the body portion is provided with laterally extending handle means to enable the turning action of the body portion upon its longitudinal center line whereby the active ingredient will be forced from each of said recesses.

3. In an applicator for the deposit of substances, such as fertilizing materials and seasoning, within bodies of materials such as earth and food stuffs, the combination of an elongated body portion having a lateral extension beyond the longitudinal center line thereof which has a transverse material receiving opening therethrough, and an active ingredient in said opening.

4. In an applicator for the deposit of substances into readily penetrable material the combination of elongated body portion having a cross sectional dimension which is wider than the thickness thereof, said body portion laterally of the longitudinal center line thereof having a recess through the thickness thereof for the receiving of a substance to be deposited, an active ingredient in said recess, and means on said body portion to facilitate turning action thereof upon the longitudinal center line of said body portion as an axis whereby to force the active ingredient from said recess.

5. An applicator as defined in claim 4 in which said body portion is provided with laterally extending wings at the opposite sides of the longitudinal center line each having said active ingredient receiving recesses therein.

6. A rotatable applicator for the deposit of active ingredients into materials such as the earth and food stuffs comprising an elongated supporting body having an opening through the thickness thereof laterally of the longitudinal center line of said elongated body, the plane of said opening being radial to the center line of turning axis of the applicator, an active ingredient pellet supported in said opening and exposed at both sides of the body whereby upon turning of the body upon its longitudinal center line while inserted into some material such as the earth or food stuff, the pellet will be forced from said opening so that upon withdrawal of the applicator said pellet will remain in the earth or food stuff.

References Cited in the file of this patent

UNITED STATES PATENTS

| 392,844 | Best | Nov. 13, 1888 |
| 936,402 | Beasley | Oct. 12, 1909 |

FOREIGN PATENTS

| 4,001 | Great Britain | Feb. 22, 1908 |
| 13,591 | Great Britain | June 13, 1906 |
| 184,586 | Great Britain | Nov. 9, 1921 |